May 11, 1926.
H. L. DUNN
OPTICAL APPARATUS
Filed April 21, 1924
1,583,965
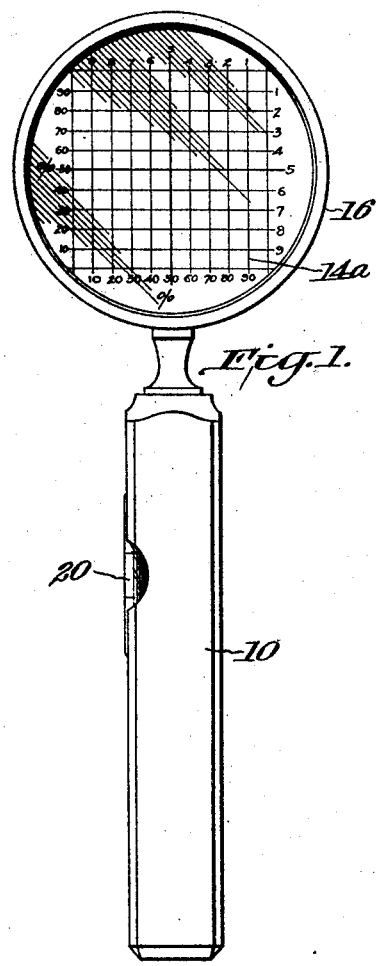
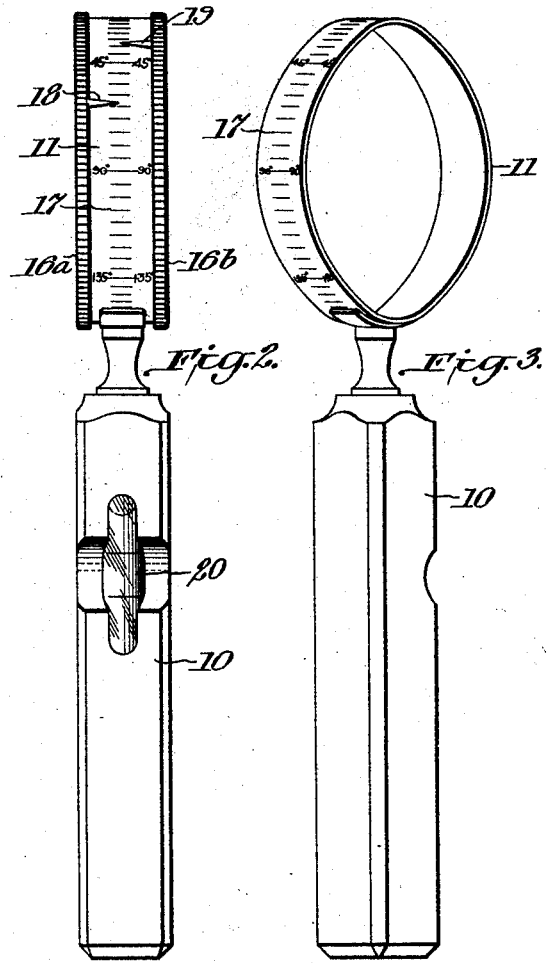
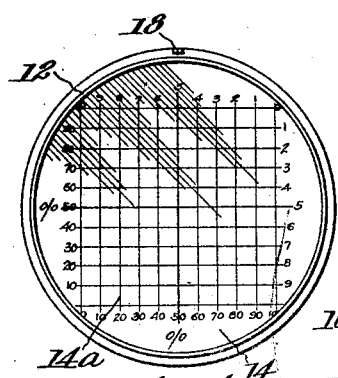 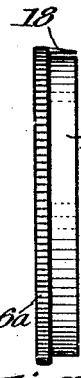 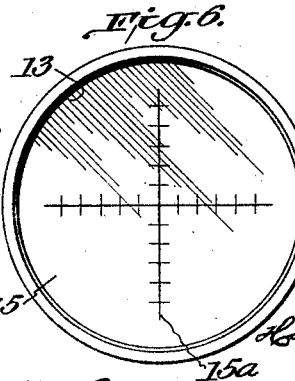 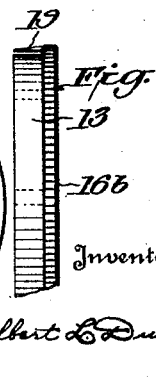

Patented May 11, 1926.

1,583,965

UNITED STATES PATENT OFFICE.

HALBERT LOUIS DUNN, OF NEW YORK, N. Y.

OPTICAL APPARATUS.

Application filed April 21, 1924. Serial No. 708,031.

The present invention relates to a sighting instrument which for the sake of brevity I term a "visio-comparator".

Instruments of this type have been used heretofore and it is the principal object of this invention to provide an instrument useful for extended application in different fields.

For a full understanding of the invention, its mode of application and its advantages, reference is made to the accompanying drawings in which—

Fig. 1 is an elevation of a device embodying the invention;

Fig. 2 is an edge view thereof;

Fig. 3 is a perspective view of part of the construction;

Figs. 4 and 5 are rear view and edge view, respectively, of another part thereof; and Figs. 6 and 7 are rear view and edge view, respectively, of still another part thereof.

On a handle portion 10 is secured a cylindrical member 11 into which are inserted from opposite sides tubular elements 12 and 13 which carry lenses 14 and 15 and are provided at their outer ends with a knurled or roughened rim 16$^a$ and 16$^b$, respectively.

The lenses have plane surfaces facing each other in the member 11 and these flat surfaces are provided with fiducial marks. While there is considerable latitude in regard to the form of the fiducial marks, I preferably use on one lens as for instance lens 14, as indicated, a reticulated design defining a large number of squares of desired dimensions, while the lens 15 preferably bears a cross 15$^a$ subdivided into like linear units. In one position, indicated in Fig. 1, the two marks are so superimposed that the cross 15$^a$ is in coincidence with the medial lines of the reticulated design 14$^a$.

The marks may be provided in various ways as for instance by etching, and the cross 15$^a$ and the medial lines of the reticulated design 14$^a$ are preferably made conspicuous by a coloring effect. I have found that by means of a red color the cross 15$^a$ and the medial lines of the reticulated design can be made to stand out with sufficient clearness to use them as fiducial lines separate and distinct from the other lines whenever it is desired to use them alone while they do not interfere with the normal use of the reticulated design as such for general purposes.

The cylindrical member 11 is externally provided with a scale 17 denoting angular degrees and the two tubular elements 12 and 13 carry pointers 18 and 19, respectively, cooperating therewith.

The opposing faces of the lenses are only slightly spaced from each other so that the two marks or scales 14$^a$ and 15$^a$ are substantially superimposed and parallax is practically avoided.

The two lenses, as a combination, are negative to obtain a relatively large field of view. While the desired result may be obtained in various ways, I prefer, for the sake of simplicity, to use one negative lens and a piece of plane glass. It is understood that in cases where a large field of view is not desired, the two lenses may each be made of plane glass.

The lines of the reticulated system represent a coordinate system, the ordinates and abscissæ of which are marked along the sides preferably so that one zero point is at the lower left hand corner and one zero point at the upper right hand corner. Both the ordinates and the abscissæ preferably denote percentage, as indicated in Fig. 4 and as explained below.

The lines defining the cross 15$^a$ bear transverse subdivision lines which correspond with the sides of the squares of the reticulated design.

The device just described is susceptible to many uses. When the cross and the medial lines of the reticulated design are exactly superimposed, the device may be used for purposes of comparing objects and landscapes to determine relative proportions of lengths or areas, as is understood from the prior art, or for roughly measuring distances, if some dimensions of an object sighted at are known.

By expressing both the ordinates and the abscissæ in terms of percentage, as shown, it is possible to directly read off a dimension of an object as a percentage of another dimension of the same object or as a percentage of a dimension of another object, provided the lines in question lie in a plane parallel to the general plane of the lenses or substantially normal to the line of sight.

This is particularly advantageous where the two lines to be compared lie at right angles to each other.

When it is desired to measure the angle formed by two lines, one of the lenses is turned until one of the medial lines of the reticulated design 14 and one arm of the cross 15 are in alignment with the two lines including the angle to be measured, when the angle may be read off from the scale 17.

In making perspective views, it is often desirable not only to know an angle included between two lines, but also the relation of these lines with respect to the perpendicular or horizontal as the case may be. In that case both lenses may be turned until they coincide with the lines in question and then, while the handle 10 is held in a definite position, as for instance determined by means of the well known bubble tube, the angle included between the lines as well as the angle between these lines and the vertical or the horizontal may be read off. At the same time the relation of length of the two lines may be determined.

The point of intersection of the medial lines of the reticulated design 14ᵃ and the point of intersection of the lines of the cross 15ᵃ lie in the geometrical center of the lenses, and thus are in coincidence irrespective of the relative angular position of the lenses.

Since the subdivision of the cross corresponds to that of the lines of the reticulated design, the length of two lines including an angle differing from 90° may be readily expressed in percentages of each other.

Not only may angles be readily measured but also reproduced by placing the device upon the paper and marking off the angles in the proper position.

In the foregoing I have indicated for the sake of example, various uses of the device. It is apparent, however, that it is useful for other purposes.

For the sake of illustration I have shown a bubble tube 20. It is understood that this tube may be placed on the handle in different positions or that two tubes may be employed in well known manner.

I claim:

1. A device of the character described, comprising a cylindrical member provided on its outer surface with a scale denoting angular degrees about the axis of the cylinder as center, and transparent elements revolubly mounted in the said member independently of each other, and an index on each element overlying the said scale, each of said elements bearing indicia including a line passing through the axis of the cylindrical member.

2. A device of the character described including a cylindrical member, transparent elements revolubly mounted in the cylindrical member, said elements having plane opposed surfaces in closely spaced relation, bearing indicia on each of said opposed surfaces including lines at right angles to each other the point of intersection of which lies in the axis of the cylindrical member, lines dividing the said lines in like units of length and means on the cylindrical member and said elements for indicating the relative angular positions thereof.

In testimony whereof, I affix my signature.

HALBERT LOUIS DUNN.